United States Patent [19]

Moate et al.

[11] Patent Number: 4,789,312

[45] Date of Patent: Dec. 6, 1988

[54] LUBRICATION PUMP WITH IMPROVED PRIMING HANDLE ASSEMBLY

[75] Inventors: Peter D. Moate; Patrick J. Read, both of Plymouth, England

[73] Assignee: Interlube Systems Limited, Devon, England

[21] Appl. No.: 81,866

[22] Filed: Aug. 5, 1987

[30] Foreign Application Priority Data

Aug. 7, 1986 [GB] United Kingdom ............. 8619327

[51] Int. Cl.$^4$ ............................................. F04B 35/00
[52] U.S. Cl. ...................................... 417/374; 92/13; 92/130 D; 184/28
[58] Field of Search ............ 417/415, 471, 374; 92/13, 130 A, 130 C, 130 D; 184/28, 27.1, 27.2, 27.3

[56] References Cited

U.S. PATENT DOCUMENTS

| | | | |
|---|---|---|---|
| 1,014,840 | 1/1912 | Mlitz | 184/27.2 |
| 1,772,319 | 8/1930 | Manzel | 184/27.2 |
| 2,140,983 | 12/1938 | Carter . | |
| 2,183,510 | 12/1939 | Thomas . | |
| 2,382,426 | 8/1945 | Kocher | 417/374 |
| 2,735,373 | 2/1956 | Le Clair | 417/374 X |
| 2,773,562 | 12/1956 | Thomas | 184/27.1 |
| 3,084,763 | 9/1963 | Thomas | 184/27.1 |
| 3,140,664 | 7/1964 | Thomas | 92/13 X |
| 3,231,148 | 1/1966 | Miller | 92/13 X |
| 4,047,845 | 9/1977 | Reeve . | |
| 4,099,597 | 7/1978 | Powell et al. | 417/471 X |

FOREIGN PATENT DOCUMENTS

| | | |
|---|---|---|
| 2005685 | 9/1971 | Fed. Rep. of Germany . |
| 384041 | 3/1908 | France . |
| 232713 | 4/1925 | United Kingdom . |
| 464734 | 4/1937 | United Kingdom . |
| 467324 | 6/1937 | United Kingdom . |

Primary Examiner—Leonard E. Smith
Attorney, Agent, or Firm—Merchant, Gould, Smith, Edell, Welter & Schmidt

[57] ABSTRACT

A lubrication pump includes a piston and cylinder pump assembly comprising a piston arranged for reciprocation within and relative to a cylinder and having a charging stroke and a discharging stroke, a motor drivingly connected to the piston and cylinder assembly and a priming means including a priming handle coupled to the piston and cylinder assembly. In order to reduce the risk of damage to the pump or parts of a downstream lubricant distribution system through excessively forceful use of a priming handle and to provide a visual indication of the operation of the pump, a resilient member is provided in the coupling between the priming handle and the assembly such that movement of the priming handle to move the piston relative to the cylinder through the discharging stroke can take place without corresponding movement of the piston relative to the cylinder by deformation of the resilient member.

11 Claims, 2 Drawing Sheets

LUBRICATION PUMP WITH IMPROVED PRIMING HANDLE ASSEMBLY

The present invention relates to a pump for supplying lubricant to selected parts of static/mobile equipment.

It is recognized that, for a wide variety of equipment, regular and adequate lubrication of relatively movable parts is essential if the equipment is to function reliably and efficiently. In the case of industrial machinery, for example, inadequate lubrication can result in lost production and poor productivity, as well as increased costs due to the need to purchase replacement parts. With this in view, lubrication systems have been developed for installation on equipment to facilitate the lubricating operation.

One known type of lubrication system comprises a plurality of outlets each arranged to deliver lubricant to a respective part of the equipment on which the system is installed. Lubricant is delivered to the outlets from a lubricant reservoir by a pump which is able to deliver, at pre-determined intervals, a pre-determined quantity of fluid.

The pump has a motor-driven piston which reciprocates at intervals within a cylinder. As it reciprocates, the piston draws lubricant via an inlet valve into the cylinder from a lubricant reservoir, and then expels the lubricant via an outlet valve into the lubricant distribution system.

Occasionally, for example when the pump is installed, or when the lubricant reservoir has been drained, it may be necessary to prime the lubrication pump. In a pump of the known type described above, this is achieved by use of a priming handle, which is rigidly connected, via a connector rod, to the piston. Manual reciprocation of this handle causes mutual reciprocation of the piston, thereby priming the pump and lubrication system. However, although this mechanism is quite satisfactory when used correctly, we have found that excessively forceful use of the priming handle can cause damage either to the pump motor and the associated mechanism for driving the piston or, by causing excessive lubricant pressure, to downstream parts of the lubricant distribution system.

A pump for pumping fuel is known from GB No. 467 324 in which a priming handle is connected to a piston via a lost motion mechanism. During priming, the mechanism allows the piston to be drawn manually through a charging stroke, the discharging stroke being powered upon release of the handle by the return of a spring compressed between the piston and pump housing during the charging stroke. When the pump has been primed, the priming handle is clamped to the housing of the pump to seal a pump chamber. During subsequent operation of the pump, the reciprocation of the driven piston relative to the stationary handle is accommodated by the lost motion mechanism with the discharge stroke of the piston being powered by the return of the compression spring compressed between the piston and the pump housing, as in the priming operation.

Although it is not pointed out in GB No. 467324, the lost motion mechanism incorporated in this pump would apparently prevent the application of a manually applied force to the piston during the discharge stroke of the priming operation. However, the mechanism would also prevent the mutual reciprocation of the priming handle with the piston which provides an important visual indication of the correct operation of a lubrication pump. Also, the stiffness of the compression spring is limited by the characteristics required of it during normal operation of the pump and, since that spring powers the discharging stroke during priming of the pump, the rate of priming is limited.

It is, therefore, an object of this invention to provide a lubrication pump in which the risk of damage to the pump or parts of a downstream lubricant distribution system through excessively forceful use of a priming handle is reduced, in which there is provided a visual indication of the operation of the pump and which can be designed to be primed rapidly.

According to the present invention there is provided a lubrication pump including a piston and cylinder pump assembly comprising a piston arranged for reciprocation within and relative to a cylinder and having a charging stroke and a discharging stroke, a motor drivingly connected to the piston and cylinder assembly and a priming means including a priming handle coupled to the piston and cylinder assembly characterized in that a resilient member is provided in the coupling between the priming handle and the assembly such that movement of the priming handle to move the piston relative to the cylinder through the discharging stroke can take place without corresponding movement of the piston relative to the cylinder by deformation of the resilient member.

The resilient member provides a lost motion mechanism which allows the priming handle to be moved manually without transmitting excessive forces to the pump motor and the associated driving mechanism or causing excessive lubricant pressure in downstream parts of a lubricant distribution system. The risk of damage to the pump or to downstream parts of the lubricant distribution system is thereby reduced. The resilient member causes the handle to reciprocate with the piston and cylinder assembly, thereby providing a visual indication of the operation of the pump and also applies an additional force to reciprocate the piston relative to the cylinder during priming of the pump so that a more rapid rate of priming can be obtained.

The priming handle may be slideably coupled to the piston or cylinder of the piston and cylinder assembly.

The priming handle may be coupled to the piston or cylinder of the piston and cylinder assembly via a connecting member slideably mounted within a cavity in the priming handle, the lost motion between the priming handle and the piston and cylinder assembly being accommodated by deformation of the resilient member which is located within the cavity.

The resilient member may be a compression spring.

The coupling between the priming handle and the piston and cylinder assembly may be arranged such that movement of the priming handle to move the piston relative to the cylinder through the charging stroke positively drives the piston to the end of its charging stroke. Such a coupling is advantageous in that it will ensure that the charging of the cylinder during the priming operation is not hindered as a result of the lost motion mechanism allowing relative movement of the priming handle and the piston and cylinder assembly.

The pump may include means for adjusting the stroke length of the piston and cylinder assembly. This provides a means for controlling the amount of lubricant discharged by the pump per cycle of the piston and cylinder assembly.

The adjusting means may comprise a sleeve which limits movement of the priming handle in the direction to move the piston relative to the cylinder through the discharging stroke, the position of the sleeve being adjustable to adjust the limit of movement of the handle.

According to a preferred embodiment of the invention the pump motor is arranged positively to drive the piston relative to the cylinder during the charging stroke but is uncoupled therefrom during the discharging stroke, the piston being resiliently biased by means additional to the resilient member for movement relative to the cylinder through the discharging stroke. This embodiment has the advantage that the rate at which the lubricant is expelled during normal operation (after priming) is therefore determined by the resilient bias of the additional means rather than by the torque of the motor, thereby making the pressure of the lubricant in the lubricant distribution system independent of variations in the motor torque. The additional resilient biasing means may also be a compression spring.

The motor and the priming handle may be arranged to drive the piston of the piston and cylinder assembly, thereby conveniently allowing the inlet and outlet parts of the piston and cylinder assembly to be formed on a stationary cylinder.

According to another aspect of the invention there is provided a lubricant distribution system incorporating a lubrication pump of the type defined above.

By way of example, an embodiment of the invention will now be described with reference to the accompanying drawings, of which:

Figure 1:
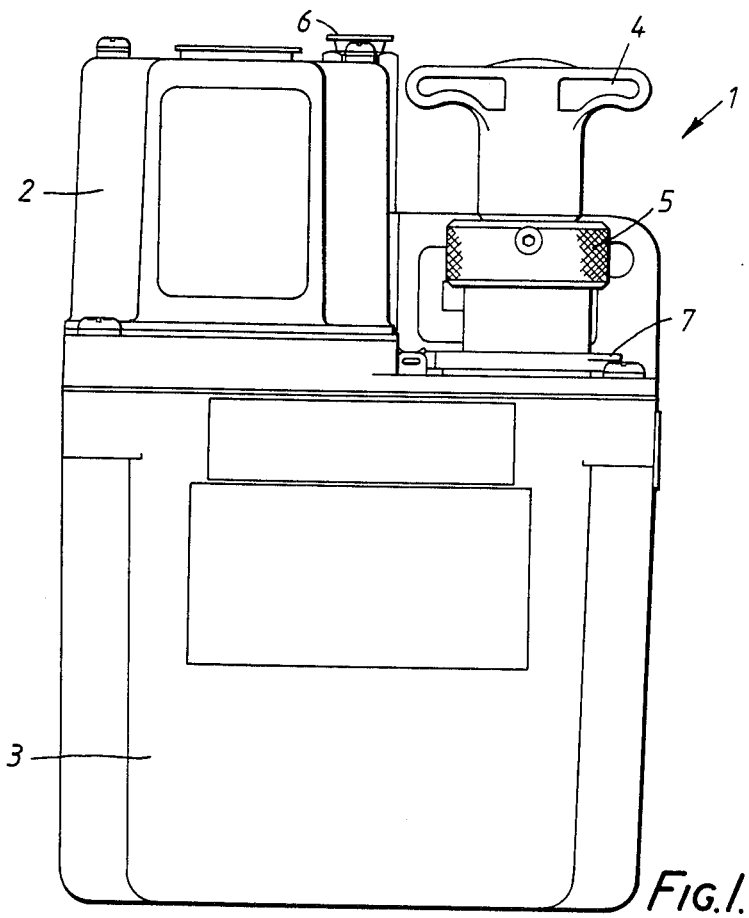
FIG. 1 is a side view of a lubrication pump.
Figure 2:
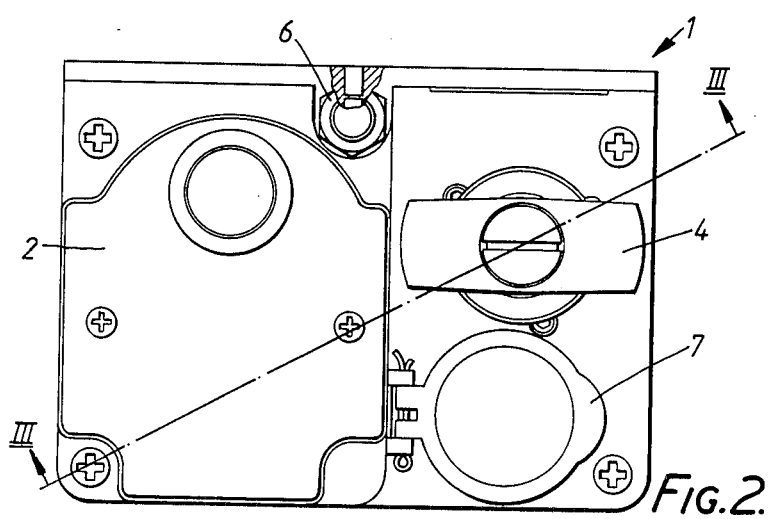
FIG. 2 is a plan view of the lubrication pump.
Figure 3:
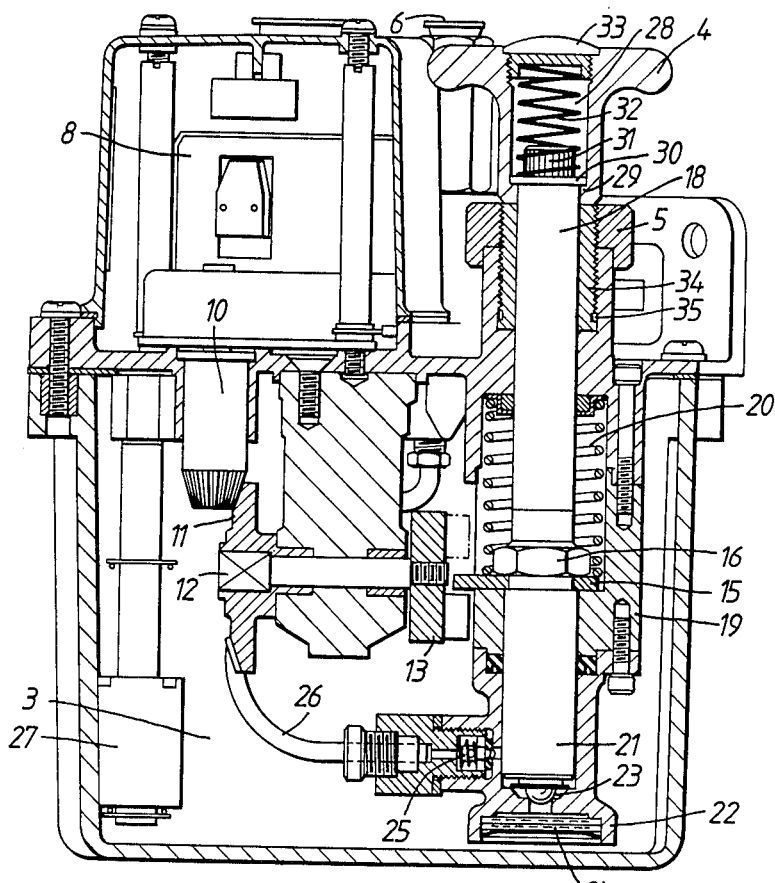
FIG. 3 is a sectional view taken along the line III—III of FIG. 2.

Referring to the drawings, a lubrication pump 1 is provided with a motor casing 2 housing a motor 8, a lubricant reservoir 3, a priming handle 4, a lubricant outlet fitting 6 and a lubricant filler cap 7.

Figure 4:
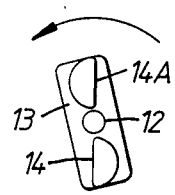
FIG. 4 is a front view of a cam used in the lubrication pump.

The motor 8 drives a pinion 10 which engages a gear 11 which in turn is coupled via a drive shaft 12 to a cam 13. As shown in FIG. 4, the cam 13, which rotates in the direction indicated by the arrow, is in the form of a vertically mounted plate, on one face of which are two diametrically opposed lugs 14, 14A of D-shaped cross-section mounted with their axes parallel to the axis of the cam 13. The walls of the lugs 14, 14A act as cam surfaces and are engaged by cam follower 15.

Figure 5:
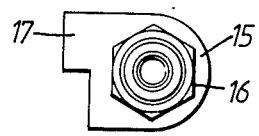
FIG. 5 is a plan view of a cam follower used in the lubrication pump.

As can be seen in FIG. 5, the cam follower 15 takes the form of a horizontal flat plate having at one end a projecting rectangular portion 17 extending over one half of the width of the cam follower 15.

The cam follower 15 is secured by a locknut 16 to a substantially vertical connector rod 18, and is positioned adjacent to the face of the cam 13 such that the outwardly extending portion 17 is located to one side of the vertical diameter of the cam 13. The portion 17 of the cam follower therefore engages only that lug 14 of the rotating cam 13 which is moving upwardly, the downwardly moving lug 14A passing to the side of the extended portion 17.

The connector rod 18 is slideably mounted in a bearing body 19, and is urged downwards therewithin by a compression spring 20. The lowest part of the connector rod 18 is formed as a piston 21 within a cylinder 22 which is attached to the lower end of the bearing body 19. At the lower end of the cylinder 22 are an inlet valve 23 and an inlet filter 24. On one side of the cylinder 22 is an outlet check valve 25, which is connected via tubing 26 to the outlet fitting 6 on the exterior of the pump. Also mounted within the lubricant reservoir 3 is a float level switch 27.

Connected to the upper end of the connector rod 18 is the priming handle 4. Extending through the priming handle from top to bottom is a cylindrical cavity 28, the lower portion of which is of slightly reduced diameter, thereby providing a protruding annular lip 29, the interior diameter of which is such as to provide a sliding fit for the upper end of the connector rod 18. A washer 30, secured to the upper end of the connector rod 18 by a screw 31, has an external diameter slightly greater than the external diameter of the connector rod 18, so as to limit downward movement of the connector rod relative to the handle 4. The washer 30 and the connector rod 18 are urged downwards within the cavity 28 in the priming handle 4 by a spring 32, the upper end of which engages a spring retention moulding 33 press-fitted into the top of the handle 4.

Seated in recess 35 in the upper end of the bearing body 19 is an adjustment screw 34 in the form of a sleeve of D-shaped cross-section which is slideably mounted around the upper end of the connector rod 18. A screw thread, provided on the external surface of the adjustment screw 34 cooperates with an internally screw-threaded stroke adjuster 5 which abuts the upper end of the bearing body 19 whilst the flattened face of the D-shaped screw 34 cooperates with the recess 35 to prevent rotation of the screw therewithin. The height of the adjustment screw 34 within the recess 35 may thereby be adjusted by rotation of the stroke adjuster 5. The upper surface of the adjustment screw 34 engages the bottom surface of the priming handle 4, thereby limiting the downward movement of the priming handle 4, and thus controlling the stroke length of the piston 21.

The lubrication pump operates as follows: the motor 8 drives the pinion 10 with a rotational period typically in the range of one minute to one hour. The pinion 10 engages the gear wheel 11, thereby rotating the drive shaft 12 and the cam 13. As the cam 13 rotates, the upwardly moving lug 14 engages the extended portion 17 of the cam follower 15, thereby driving the connector rod 18 upwards, and compressing the spring 20. The upward motion of the connector rod 18 in the cylinder 22 causes lubricant to be drawn into the cylinder 22 from the lubricant reservoir assembly 3 through the inlet filter 24 and the inlet valve 23, the check valve 25 being held closed. As the upwardly moving lug 14 reaches the top of its ascent, the rotary motion of the cam 13 causes the lug 14 to be displaced sideways, thereby disengaging it from the extended portion 17 of the cam follower 15. The connector rod 18 is consequently free to be driven downwards by the compressed spring 20, expelling the lubricant from the cylinder 22 through the check valve 25 which opens under the pressure exerted and via the tubing 26 to the outlet fitting 6.

The downward movement of the connector rod 18 is limited by the abutment of the lowest part of the priming handle 4 with the top edge of the adjustment screw 34. The stroke length of the pump may therefore be adjusted by rotating the stroke adjuster 15 to raise or lower the adjustment screw 34 within the recess 35 in the bearing body 19; the maximum stroke length being limited by the abutment of the lower end of the adjustment screw 34 with the bottom of the recess 35 in the bearing body 19. The continual rotation of the cam 13 subsequently brings the second lug 14A into contact with the cam follower 15, thereby raising the connector rod 18 once more and repeating the pumping cycle.

At all times the float switch assembly 27 monitors the height of the lubricant in the reservoir 3 and it may therefore be used to trigger a warning signal to indicate that the lubricant level has fallen below a predetermined minimum.

The priming operation, which consists of the manual reciprocation of the priming handle 4, operates as follows: when the priming handle 4 is raised, the protruding lip 29 at the bottom of the cavity in the handle 4 engages the washer 30 at the top of the connector rod 18, thus raising the connector rod 18 and drawing lubricant through the inlet valve 23 into the cylinder 22. The cam follower 15 rises with the connector rod 18, thereby losing contact with the cam surface 14.

When the priming handle 4 is pushed down again, the downwards force is transmitted by the spring 32 to the connector rod 18, thereby causing the connector rod to move downwards until further motion is prevented either by the abutment of the priming handle 4 with the adjustment screw 34, or by the re-engagement of the cam follower 15 with the cam 13. In the latter case, downward motion of the connector rod 18 will cease before abutment of the priming handle 4 with the stroke adjustment screw 34. However, transmission of excessive forces to the cam 13 and cam follower 15 is prevented by the lost motion mechanism in the priming handle 4, whereby continued downward pressure on the priming handle causes compression of the spring 32, allowing the washer 30 to rise up within the cavity 28 until the priming handle 4 abuts the adjustment screw 34, thereby limiting the force transmitted to the connector rod 18. Similarly, if high lubricant pressure prevents downward movement of the piston 21, the lost motion mechanism again allows the connector rod 18 to ride up within the priming handle 4, thereby preventing excessive increases in lubricant pressure. The lost motion mechanism thus prevents damage either to the pump motor and associated drive mechanism, or, by causing excessive lubricant pressure, to downstream parts of the lubricant distribution system.

During normal operation of the pump, the spring 32 in the priming handle 4 causes the handle to reciprocate with the piston 21, thereby providing a visual indication that the pump is operating.

Furthermore, during the priming operation, the spring 32 allows an extra force to be exerted on the piston 21 during the discharging stroke above that provided by the compressed spring 20. The stiffness of the spring 32 can therefore be selected so as to provide a desired force on the piston 21 during priming, while a smaller desired force is exerted on the piston during normal operation. In some applications, the extra force exerted on the piston during priming may be chosen to be minimal and in others it may be chosen to be significant. The pump may therefore be primed rapidly, but without the risk of causing damage to the pump or the downstream distribution system through excessively forceful use of the priming handle 4.

What is claimed:

1. A lubrication pump including a piston and cylinder pump assembly comprising a piston arranged for reciprocation within and relative to a cylinder and having a charging stroke and a discharging stroke, a motor drivingly connected to the piston and cylinder assembly and a priming means including a priming handle coupled to the piston and cylinder assembly, characterized in that a resilient member is provided in the coupling between the priming handle and the assembly such that movement of the priming handle to move the piston relative to the cylinder through the discharging stroke can take place without corresponding movement of the piston relative to the cylinder by deformation of the resilient member.

2. A pump according to claim 1 in which the coupling between the priming handle and the piston and cylinder assembly is arranged such that movement of the priming handle to move the piston relative to the cylinder through the charging stroke positively drives the piston to the end of its charging stroke.

3. A pump according to claim 1 in which the motor is arranged positively to drive the piston relative to the cylinder during the charging stroke but is uncoupled therefrom during the discharging stroke, the piston being resiliently biased for movement relative to the cylinder through the discharging stroke.

4. A pump according to claim 1 in which the priming handle is coupled to the piston of the piston and cylinder assembly.

5. A pump according to claim 1 in which the resilient member is a compression spring.

6. A pump according to claim 1 in which the priming handle is slideably coupled to the piston of the piston and cylinder assembly.

7. A pump according to claim 6 in which the resilient member is a compression spring.

8. A pump according to claim 6 in which the priming handle is coupled to the piston of the piston and cylinder assembly via a connecting member slideably mounted within a cavity in the priming handle and in which lost motion between the priming handle and the piston and cylinder assembly is accommodated by deformation of the resilient member which is located within the cavity.

9. A pump according to claim 8 in which the resilient member is a compression spring.

10. A pump according to claim 1, including means for adjusting the stroke length of the piston and cylinder assembly.

11. A pump according to claim 10 in which the adjusting means comprises a sleeve which limits movement of the priming handle in the direction to move the piston relative to the cylinder through the discharging stroke, the position of the sleeve being adjustable to adjust the limit of movement of the handle.

* * * * *